United States Patent [19]

Morgan

[11] 3,943,110

[45] Mar. 9, 1976

[54] FIBER AND FILM-FORMING NUCLEARLY-HALOGENATED POLY(1,4-BENZAMIDES)

[75] Inventor: Paul Winthrop Morgan, West Chester, Pa.

[73] Assignee: E. I. Du Pont de Nemours and Company, Wilmington, Del.

[22] Filed: May 28, 1974

[21] Appl. No.: 473,661

[52] U.S. Cl............ 260/78 A; 260/30.8 R; 260/78 S; 260/78 SC; 264/176 F; 264/211; 264/331
[51] Int. Cl.²......................................... C08G 69/12
[58] Field of Search............................ 260/78 A

[56] References Cited
UNITED STATES PATENTS

| | | | |
|---|---|---|---|
| 3,225,011 | 12/1965 | Preston et al.............. | 260/78 A |
| 3,622,545 | 11/1971 | Foldi et al................. | 260/78 A |
| 3,652,510 | 3/1972 | Blomberg................... | 260/78 A |
| 3,753,957 | 8/1973 | Jones........................ | 260/78 A |

*Primary Examiner*—Lucille M. Phynes

[57] ABSTRACT

Fiber and film-forming nuclearly-halogenated poly(1,4-benzamides) are prepared by thermal polymerization of nuclearly-halogenated aminobenzoyl halides and their hydrochlorides. The polymers can be dissolved and shaped into useful fibers and films that have low flammability.

5 Claims, No Drawings

FIBER AND FILM-FORMING NUCLEARLY-HALOGENATED POLY(1,4-BENZAMIDES)

BACKGROUND OF THE INVENTION

Preston et al. U.S. Pat. No. 3,225,011 teaches the preparation of poly-p-aminobenzoic acid by a slurry polymerization technique in which a proton acceptor is employed. Kwolek U.S. Pat. No. 3,600,350 teaches the solution preparation of poly(1,4-benzamide) and copolymers of poly(1,4-benzamide) wherein up to 20 mole percent of copolymeric units may be derived from halogen-substituted derivatives of 4-aminobenzoyl chloride hydrochloride, e.g., 2-chloro-4-aminobenzoyl chloride hydrochloride.

Caldwell et al. U.S. Pat. No. 3,408,334 teaches the preparation of polyamides by condensing aromatic amino acids in the presence of a catalytic amount of a tin compound. Jones U.S. Pat. No. 3,753,957 teaches preparation of aromatic polyamides by condensing an aromatic ester of an aromatic amino acid to an oligomer which is then polymerized to a high viscosity product.

SUMMARY OF THE INVENTION

This invention provides film- and fiber-forming polyamides consisting essentially of repeating units of the formula

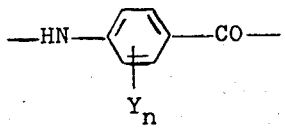

wherein Y is halogen, preferably chlorine and/or bromine and n is an integer of from 1 to 4. The polyamides, which may be described as nuclearly-halogenated poly(1,4-benzamides), are readily soluble and can be shaped into, e.g., films, fibers, and fibrids. This invention also comprehends the polyamide solutions and shaped articles.

DESCRIPTION OF THE PREFERRED EMBODIMENTS

Monomer Preparation

Monomers useful for preparing the polyamides are shown in the aforementioned Kwolek patent and may be prepared from their aminocarboxylic acid precursors by use of the general procedures of Graf and Langer, J. prakt. Chem. 148, 161–169 (1937) under anhydrous conditions. For example, 2-chloro-4-aminobenzoic acid is refluxed with thionyl chloride to produce 2-chloro-4-thionylaminobenzoyl chloride which is then converted to 2-chloro-4-aminobenzoyl chloride hydrochloride by reaction in ether with anhydrous hydrogen chloride. The benzoyl bromides and hydrobromides are obtained by use of thionyl bromide and hydrogen bromide in these procedures.

The procedures of Graf and Langer, previously noted, may be varied in both application and result. For example, the sterically-hindered 3,5-dichloro-4-aminobenzoic acid is converted into oriented needles of 3,5-dichloro-4-aminobenzoyl chloride by serial treatment with thionyl chloride and anhydrous hydrogen chloride in ether. Polymerization of these needles by the process of this invention produces the corresponding poly(3,5-dichloro-1,4-benzamide) as oriented needles.

Among the suitable monomers may be named:
2-chloro-4-aminobenzoyl chloride hydrochloride,
3-chloro-4-aminobenzoyl chloride hydrochloride,
2-bromo-4-aminobenzoyl chloride hydrochloride,
3-bromo-4-aminobenzoyl chloride hydrochloride,
2-iodo-4-aminobenzoyl chloride hydrochloride,
3-iodo-4-aminobenzoyl chloride hydrochloride
2-fluoro-4-aminobenzoyl chloride hydrochloride
3-fluoro-4-aminobenzoyl chloride hydrochloride
3,5-dichloro-4-aminobenzoyl chloride
3,5-dibromo-4-aminobenzoyl chloride
3,5-diiodo-4-aminobenzoyl chloride
3,5-difluoro-4-aminobenzoyl chloride
2,6-dichloro-4-aminobenzoyl chloride hydrochloride
2,6-dibromo-4-aminobenzoyl chloride hydrochloride
2,6-diiodo-4-amiobenzoyl chloride hydrochloride
2,6-difluoro-4-aminobenzoyl chloride hydrochloride
2,3-dichloro-4-aminobenzoyl chloride hydrochloride
2,3,5,6-tetrachloro-4-aminobenzoyl chloride hydrochloride
2,3,5,6,-tetrafluoro-4-aminobenzoyl chloride hydrochloride Similarly, the benzoyl bromides and hydrobromides corresponding to the above-named reactants may also be used in the process of this invention to provide the novel polyamides.

POLYMER PREPARATION

The polymerizations of this invention are carried out by placing an appropriate monomer or mixture of monomers in a polymerization vessel which is preferably swept with a stream of inert gas, e.g., nitrogen, which removes polymerization by-products, e.g., gaseous hydrogen chloride or hydrogen bromide. The polymerization vessel is then placed in a heating bath which may be at a temperature below or above the melting point of the monomer of monomers (for those which melt) and is permitted to remain thereat until the desired degree of polymerization is obtained. Polymeric needles are formed from monomeric needles if the polymerization is initiated below the melting point of the monomers. Many useful monomers, e.g., those in hydrohalide salt form, do not melt but thermally polymerize in the solid state. During polymerizations wherein a molten state is initially formed, the system quickly solidifies and the polymerization continues in the solid phase. The type of heating bath may vary, e.g., it may consist of the vapor of a boiling liquid (e.g., biphenyl, benzophenone, chlorobenzene, o-dichlorobenzene, diphenyl ether, diphenyl phthalate, etc.) or it may be a bath consisting of a hot liquid in which the polymerization vessel is immersed, e.g., mineral oil, silicone oil bath, or a sand bath.

The temperature of the heating bath may vary from 100° to 375°C., preferably from 130° to 300°C., and the polymerization vessel may be permitted to remain therein for from 1 to 150 hr., preferably from 5 to 30 hr. If desired, the reaction vessel may be first heated under one set of temperature/time conditions in one bath, then transferred to a second bath where it is heated under another set of temperature/time conditions until the desired degree of polymerization is attained. When the desired degree of polymerization has been obtained, the reaction vessel is removed from the heating bath, cooled, and the polymer removed there-from.

Polymers of the invention include poly(3,5-dibromo-1,4-benzamide), poly(2-chloro-1,4-benzamide), poly(3-chloro-1,4-benzamide), etc.

Polyamides exhibiting inherent viscosities as high as 4–5 may be obtained by the process of this invention. Those suitable for fiber preparation exhibit inherent viscosities (measured as described hereinafter) from 1 to 5, preferably 2 to 5; films may be obtained from such polyamides exhibiting inherent viscosities from 0.7 to 5, preferably 1.5 to 5.

SOLUTIONS AND SHAPED ARTICLE PREPARATION

Shaped articles of the polyamides of this invention may be readily prepared from the novel solutions of this invention. Solutions useful for, e.g., fiber formation may be prepared by dissolving the respective polyamides (which exhibit the inherent viscosities within the previously-cited range) at room temperature in concentrated sulfuric acid (95–104 percent) to form spinning solutions containing from about 5 to 18 percent, preferably 8 to 16 percent polymer. These solutions are extruded into suitable coagulating baths to form fibers, e.g., baths of water, mixtures of water and sulfuric acid, aqueous salt baths (e.g., ammonium sulfate, sodium sulfate). The tensile properties of these fibers are enhanced by a post-extrusion heat treatment which may consist of drawing the filaments up to 0.25X at from 250° to 500°C. over a heated surface (e.g., plate, pin, shoe) or by passing them, while they are in a taut state, through a heated inert atmosphere, preferably a nitrogen atmosphere, at from 250° to 500°C. A residence time of from 0.1 second to 6 hours may be used depending on the temperature of heat treatment.

Strong self-supporting films are prepared by casting, e.g., concentrated sulfuric acid (95–104 percent), solutions of the polyamides containing from 4 to 18 percent, preferably 6 to 16 percent polymer of the inherent viscosities noted above. Other useful solvents include HF, fluorosulfonic acid and sulfuric-fluorosulfonic acid mixtures.

The polyamides obtained in the form of needles, e.g., poly(3,5-dichloro-1,4-benzamide), are useful for the preparation of reinforced resins, plastics, moldings, and the like.

Needles prepared from unhalogenated monomers may also be converted into polymeric needles. For example, submicron-size needles of 4-aminobenzoyl chloride hydrochloride (ABC) are prepared by first dissolving 4-aminobenzoic acid (ABA) at 50°–60°C. in tetramethylene sulfone (TMS) at a molar ratio of at least 7:1 (TMS:ABA). An excess of gaseous HCl is bubbled into the solution to form a precipitate of the hydrochloride salt of ABA. The reaction mixture is cooled below 30°C. and thionyl chloride (TC) is added to form 4-aminobenzoyl chloride hydrochloride (cooling is continued). When the molar ratio of TC/ABA is within 1–14/1, the ABC precipitates as needles with dimensions of $100\mu \times 2\mu$. When the ratio of TC/ABA is 30/1, a solution results. After such a solution is cooled below 10°C. and an excess of methylene chloride is added (about 2:1 volume ratio of methylene chloride: solution), ABC precipitates as needles having dimensions of $1\mu \times 0.25\mu$. These needles are heated at 300°C., for 64 hours (the needles do not melt) to form poly(1,4-benzamide) needles, dull rose in color, $\eta$inh = 2.3, which are useful to reinforce plastics.

Halogenated poly(1,4-benzamides) containing from 3–4 percent by weight halogen can be prepared by passing wet, as-extruded poly(1,4-benzamide) yarn through an aqueous bath of sodium hypochlorite or hypobromite, after which the yarn is dried at about 100°C. Halogen uptake is increased if the yarn is first led through a pretreatment acid bath of, e.g., 6N HCl.

In paper form these halogenated polyamides consistently pass the vertical flame test described in ASTM D 626-55T.

EXAMPLES

The following nonlimiting examples are illustrative of the practice of the preferred embodiments of this invention. In these examples, inherent viscosity ($\eta$inh) has been determined in accordance with the following equation $$\eta\text{inh} = \frac{\ln(\eta\text{rel})}{C}$$

wherein ($\eta$rel) represents the relative viscosity, (C) represents a concentration of 0.5 gram of the polymer in 100 ml. of the solvent. The relative viscosity ($\eta$rel) is determined by dividing the flow time in a capillary viscometer of a dilute solution of the polymer by the flow time for the pure solvent. The dilute solution used herein for determining ($\eta$rel) is of the concentration expressed by (C) above; flow times are determined at 30°C., using concentrated (95–98 percent) sulfuric acid as a solvent. Orientation angle (O.A.) values for the fibers of this invention are measured using method 2 of Kwolek U.S. Pat. No. 3,671,542.

Fiber properties of tenacity, elongation, and initial modulus are coded as T/E/Mi and are in units of grams/denier, percent, and grams/denier, respectively.

EXAMPLE I

This example illustrates the preparation of poly(2-chloro-1,4-benzamide) by the process of this invention. 2-Chloro-4-aminobenzoic acid (20.0 g., 0.12 mole) is slurried in 180 ml. of thionyl chloride, after which the reactants are refluxed 4 hrs. under nitrogen (complete solution results after about 1 hr.). After excess thionyl chloride is removed under reduced pressure and in a nitrogen atmosphere, the residual oil is distilled in vacuo. There is obtained thereby 2-chloro-4-thionylaminobenzoyl chloride, 22 g., b.p. 124°–125°C./0.1 mm. This product is dissolved in 600 ml. of dry ether and anhydrous hydrogen chloride is passed over the solution for 16 hr. The white, powdery solid which separates is collected by filtration (nitrogen atmosphere), washed twice with dry ether, and dried in vacuo at room temperature. There is obtained 17.5 g. of 2-chloro-4-aminobenzoyl chloride hydrochloride.

A 5 g. sample of 2-chloro-4-aminobenzoyl chloride hydrochloride is placed in a dry polymerization tube, under nitrogen. As a slow-flowing stream of nitrogen passes through the tube, the tube is heated for 1.5 hr. in the vapors of boiling biphenyl (b.p. 255°C./760 mm.). The tube is then transferred to a vapor bath of boiling benzophenone (b.p. 305°C./760 mm.) and is heated therein for 18 hr. The tube is then withdrawn from the vapor bath, cooled, and the contents removed. There is obtained poly(2-chloro-1,4-benzamide), $\eta$inh = 1.40.

The monomer does not melt during the above-described polymerization and hydrogen chloride is continuously evolved.

Other polymerization techniques may be employed for polymer syntheses. For example a vessel containing a sample of the above-described monomer is placed in an Arochlor (registered T.M. of the Monsanto Co. for a series of high-boiling, chlorinated hydrocarbons) bath at 150°C. Over a period of 18 hr. the bath temperature is gradually raised to 305°C. and the reaction vessel is maintained therein for 150 hr. The vessel is removed, cooled, and the product collected. The poly(2-chloro-1,4-benzamide) obtained exhibits an inherent viscosity of 1.47.

EXAMPLE II

This example illustrates the preparation of high modulus poly(2-chloro-1,4-benzamide) fibers.

Part A

A 3.5 g. sample of poly(2-chloro-1,4-benzamide) ($\eta$inh = 1.47, prepared in Example I, above) is dissolved at room temperature in 46.5 g. of concentrated (96–98 percent) sulfuric acid to provide a spinning solution containing 7 percent solids. This solution is extruded through a 5-hole spinneret, each hole of 0.127 mm. diameter, into a coagulating bath of room temperature distilled water. The fibers are washed overnight in a bath of 5 percent sodium bicarbonate, after which they are washed with distilled water, and dried. These fibers exhibit the following tensile properties: T/E/Mi: 1.5/12/70.

After the as-extruded fibers are hand drawn 1.2X in a nitrogen atmosphere at 425°C. over a 7.62 cm. hot bar, they exhibit the following properties: T/E/Mi: 5/0.9/515; orientation angle is 15°.

Part B

A spinning solution containing 10 percent by weight poly(2-chloro-1,4-benzamide) ($\eta$inh = 1.47) is prepared in concentrated (96–98 percent) sulfuric acid and is extruded, washed, and dried as in Part A, above. The as-extruded fibers are hand drawn 1.2X at 400°C. over a 7.62 cm. hot bar ($N_2$ atmosphere). After they are passed while taut, through a nitrogen atmosphere heated to 500°C. (residence time in heated zone is 1–3 sec.), the fibers exhibit the following properties: T/E/Mi: 4/0.7/600; orientation angle is 15°.

EXAMPLE III

This example illustrates the preparation of poly(3-chloro-1,4-benzamide).

A 1.5 g. sample of 3-chloro-4-aminobenzoyl chloride hydrochloride is placed in a polymerization tube which is swept with a stream of nitrogen. The tube and contents are heated at 300°C. for 24 hr., after which hydrogen chloride fumes are no longer evolved. The contents of the tube are removed, washed with methylene chloride, and dried under vacuum, to yield 1.02 g. of poly(3-chloro-1,4-benzamide), $\eta$inh = 1.74.

EXAMPLE IV

This example illustrates the preparation of needles of poly(3,5-dichloro-1,4-benzamide) by solid phase polymerization.

In a 5 l. round bottom, 3-necked flask are placed 411.42 g. (3 moles) of p-aminobenzoic acid and 3,648 g. of glacial acetic acid. To the resulting clear solution, cooled in ice, are added 212.74 g. of chloride over a period of 3 hrs. A precipitate forms during the first few minutes and remains throughout the chlorination. At the end of the 3 hr. period, the precipitate is filtered and is washed with water and with dilute sodium hydroxide solution. The filtrate and washing are added to 3 times their volume of water whereupon a precipitate forms. This precipitate is removed by filtration and dissolved in dilute sodium hydroxide solution (an insoluble portion is removed). The basic solution is then acidified with concentrated hydrochloric acid to cause formation of a precipitate. The latter is removed, washed, and dried to yield 18.5 g. of 3,5-dichloro-4-aminobenzoic acid which sublimes rapidly at 290°C.

The 3,5-dichloro-4-aminobenzoic acid is refluxed with 200 ml. of thionyl chloride. A solution forms in 1 hr. and heating is maintained for 2 additional hours, after which the reaction mixture is permitted to stand overnight. Excess thionyl chloride is removed by evaporation to leave a yellow-brown crystalline mass as a residue. This is recrystallized from a mixture of n-hexane/ethylene chloride (90/10 by volume) to produce a light tan crystalline product, m.p. = 155°C. A portion of this material is recrystallized from methylene chloride as pale yellow needles existing in round clusters. These needles are dissolved in methylene chloride and anhydrous hydrogen chloride is bubbled into the solution. The yellow color is discharged and off-white needles of 3,5-dichloro-4-aminobenzoyl chloride are obtained, m.p. = 165°C.

Analysis (in percent): Calculated for $C_7H_4ONCl_3$: C, 37.4; H, 1.74.

Found: C, 37.3; H, 1.62.

Into a polymer tube equipped with a side arm and a nitrogen capillary bleed are placed 5.0 g. of 3,5-dichloro-4-aminobenzoyl chloride needles. The polymer tube is heated in a bath maintained at 300°C. Hydrogen chloride evolves and the contents of the tube become opaque and more compact but do not melt down. Hydrogen chloride is still evolved after 7 hr. heating; heating is maintained for an additional 7 hr. The fibrous, needle-like product is easily removed from the tube. A sample of the poly(3,5-dichloro-1,4-benzamide) from the upper portion of the tube exhibits an inherent viscosity of 0.85 and a sample removed from the lower portion of the tube exhibits an inherent viscosity of 1.44.

EXAMPLE V

Part A

This example illustrates the preparation of fibers of poly(3,5-dichloro-1,4-benzamide) by wet spinning.

Into a test tube equipped with a stirrer is placed 0.5 g. of poly(3,5-dichloro-1,4-benzamide) ($\eta$inh = 1.44, prepared in the previous example) and 4.5 ml. of concentrated (96–98 percent) sulfuric acid. These materials are stirred until a clear solution is formed. This solution (containing 5.8 percent by weight polymer) is placed in a hypodermic-type spinning cell equipped with a 5-hole spinneret having holes of 0.01 cm. diameter, each, and is extruded into an aqueous coagulating bath prepared from water and concentrated sulfuric acid in an 80/20 volume ratio. The fibers are wound up on a bobbin at the rate of 15.8 m./min. The fibers are extracted overnight on the bobbin in room temperature water. After being dried, the as-extruded fibers exhibit the following tensile properties: T/E/Mi/Den.: 1.12/9.4/48.9/13.8. After the fibers, in a taut condition, are passed through a heated (400°C.) nitrogen atmosphere (residence time is 1-3 seconds), the fibers exhibit the following tensile properties: T/E/Mi/Den.: 1.42/2.46/75.3/12.6.

Part B

Poly(3,5-dichloro-1,4-benzamide) (8.0 g., ηinh = 0.81, prepared as in Example IV but with 70 hr. heating), is dissolved in 45 g. of 100 percent sulfuric acid to form a 15.1 percent solution. The solution is extruded through a 20-hole spinneret, each hole having a diameter of 0.10 mm., into an ethanol-water (70-30 by vol.) bath at 30°C. The fiber is wound up at 14 feet per minute without extension in the bath. The water-washed, air-dried fiber has T/E/Mi/Den. of 1.34/3.6/75/32.

EXAMPLE VI

This example illustrates unsuccessful attempts to prepare poly(2-chloro-1,4-benzamide) of fiber-forming molecular weight by solution polymerizations.

Part A

A 2 g. sample of 2-chloro-4-aminobenzoyl chloride hydrochloride is placed in a small polymerization flask, under nitrogen. Cold N,N,N',N'-tetramethylurea (14 ml.) is added thereto, causing complete solution to occur in a few minutes. The cold reaction mixture is stirred 3 hours, then is allowed to stand overnight while warming to room temperature. No solid or gel forms. The contents of the flask are combined with water and the solid produced thereby is collected, washed, and dried. There is obtained poly(2-chloro-1,4-benzamide), ηinh = 0.17.

Part B

A 1 g. sample of 2-chloro-4-aminobenzoyl chloride hydrochloride is combined with 9 ml. of a cold mixture of hexamethylphosphoramide/lithium chloride (90/10 by wt.). A rapid increase in the reaction mixture viscosity occurs. After 3 ml. more of the above-described cold amide/salt mixture are added to the polymerization vessel, the contents of the vessel are stirred in the cold for 3 hr., then are allowed to come to room temperature while being permitted to stand overnight. The product is isolated, washed, and dried to provide poly(2-chloro-1,4-benzamide) as a fine powder, ηinh = 0.21.

Part C

A 2.2 g. sample of 2-chloro-4-aminobenzoyl chloride hydrochloride is dissolved in 22 ml. of 2,4-dimethyltetramethylene sulfone. To this cooled solution are added 2.3 ml. of 2,6-lutidine and the combined ingredients are stirred for 3 hr. in the cold. After the reaction mixture has stood overnight at room temperature, the reaction product is precipitated, collected, washed and dried as in Part A to provide poly(2-chloro-1,4-benzamide), ηinh = 0.12.

EXAMPLE VII

This example illustrates the preparation of fibrous product and a film from poly(3,5-dichloro-1,4-benzamide).

Poly(3,5-dichloro-1,4-benzamide) (ηinh = 1.44) is dissolved in 96-98 percent sulfuric acid to form a 5 percent solution. The solution is poured into water in a home-style blender running at high speed. The resulting product is washed and dried and is finely fibrous and fluffy. It is suitable for paper making and for filling of resins and plastics.

This precipitated polymer forms clear solutions in N,N-dimethylacetamide containing 6.5 percent lithium chloride (by weight) and in N-methylpyrrolidone-2 containing 5 percent lithium chloride. The latter solvent is used to form a slightly hazy, self-supporting film by spreading, drying at 100°C., washing in water, and redrying.

What is claimed is:

1. A polyamide consisting essentially of repeating units of the formula

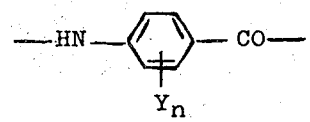

wherein Y is halogen and n is an integer of from 1 to 4, the said polyamide having an inherent viscosity of at least 1.0, determined at 30°C using 0.5 gm of polymer in 100 ml of conc. 95-98% sulfuric acid.

2. The polymer of claim 1 wherein Y is chlorine and n is 1.

3. The polymer of claim 1 wherein Y is chlorine and n is 2.

4. A fiber of the polymer of claim 1.

5. A process for preparing a polyamide consisting essentially of repeating units of the formula

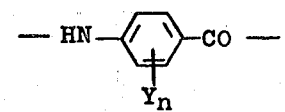

wherein Y is halogen and n is an integer of from 1 to 4, the said polyamide having an inherent viscosity of at least 1.0 comprising heating a nuclearly-halogenated aminobenzoyl halide or its hydrochloride at a polymerization temperature of at least 100°C in contact with a stream of inert gas whereby the gaseous hydrogen halide that is produced as a by-product is removed.

* * * * *